F. LAIBLE.
PROCESS OF FORMING CARRIAGE CURTAIN KNOBS.
APPLICATION FILED OCT. 21, 1907.

937,157.

Patented Oct. 19, 1909.

WITNESSES:
C. H. Barth
O. W. Miles

INVENTOR.
Frank Laible
BY
Walter F. Murray
ATTORNEY

UNITED STATES PATENT OFFICE.

FRANK LAIBLE, OF AUGUSTA, KENTUCKY, ASSIGNOR TO THE F. A. NEIDER COMPANY, OF AUGUSTA, KENTUCKY, A CORPORATION OF KENTUCKY.

PROCESS OF FORMING CARRIAGE-CURTAIN KNOBS.

937,157.  Specification of Letters Patent.  Patented Oct. 19, 1909.

Application filed October 21, 1907. Serial No. 398,362.

*To all whom it may concern:*

Be it known that I, FRANK LAIBLE, a citizen of the United States of America, and resident of Augusta, county of Bracken, State of Kentucky, have invented certain new and useful Improvements in Processes of Forming Carriage - Curtain Knobs, of which the following is a specification.

The object of my invention is a process of forming carriage curtain knobs whereby a knob in which the head has a smooth contour and a firmly connected head and shank may be obtained.

In the accompanying drawings I have illustrated the blanks and dies by means of which my process may be carried out.

Figure 1:
Figure 3:
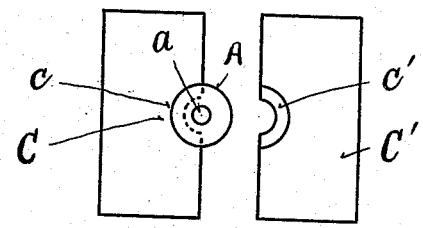
Figure 2:
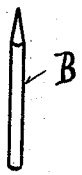
Figure 5:
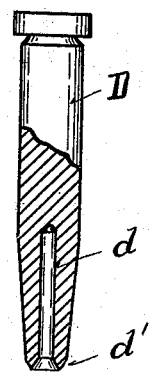
Figure 5:
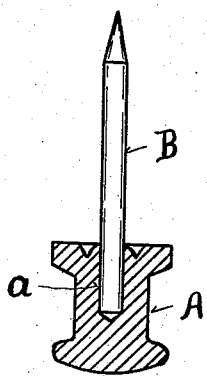
Figure 4:
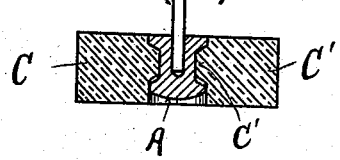

Figure 1 is a view of the head blank in elevation. Fig. 2 is a perspective view of the shank. Fig. 3 is a plan view of the two members of the vise. Fig. 4 is a sectional view of the vise, the head blank, and part of the die, the shank being shown in elevation. Fig. 5 is a view partly in section and partly in elevation of the completed knob.

Referring to the parts: the head blank, A, is made of wrought metal and has an axial bore, $a$. The vise consists of two blocks, C, C', each having in their contacting faces recesses, $c$, $c'$, of a contour corresponding in shape to half of the head-blank, so that when the contacting faces are brought together there is a chamber formed by the recesses, $c$, $c'$, which corresponds exactly in shape to that of the head blank. The die, D, has a bore, $d$, of a diameter and a length so as to receive the shank, B, and its mouth, $d'$, is beveled or bell-shaped. In the first step in my process the head blank, A, is seated in the chamber formed by the recesses, $c$, $c'$, the blocks, C, C', being held together in any desired manner. The shank, B, is then seated in the bore, $a$. A die, D, is then placed over the shank, B, and its bell-mouth, $d'$, is forced into the end of the head-blank, in any desired manner, for instance, by a blow from a hammer. This draws the metal adjacent to the shank into the bell-mouth and crowds it firmly about the shank. With a button formed in this manner, it is seen that the head blank is held firmly, so that the crowding of the metal around the shank does not distort nor mar its surface. A knob of smooth and regular outline may therefore be produced by this process.

What I claim is:

The process of forming carriage curtain knobs which consists in holding an axially bored head blank in a close fitting vise, inserting a shank in the bore, placing a die with a bell mouth and with beveled edges over the shank and forcing it into the blank so as to crowd the metal in the end of the blank about the shank.

FRANK LAIBLE.

Witnesses:
 GEO. P. WEIMER,
 CHARLES L. HOOK, Jr.